(12) United States Patent
Lee et al.

(10) Patent No.: US 8,279,555 B2
(45) Date of Patent: Oct. 2, 2012

(54) MAGNETIC RECORDING MEDIA AND METHOD OF FABRICATING THE SAME

(75) Inventors: Myung-bok Lee, Suwon-si (KR); Jin-seung Sohn, Seoul (KR); Hoo-san Lee, Osan-si (KR)

(73) Assignee: Seagate Technology International, Grand Cayman (KY)

( * ) Notice: Subject to any disclaimer, the term of this patent is extended or adjusted under 35 U.S.C. 154(b) by 952 days.

(21) Appl. No.: 12/057,406

(22) Filed: Mar. 28, 2008

(65) Prior Publication Data

US 2009/0135527 A1      May 28, 2009

(30) Foreign Application Priority Data

Nov. 23, 2007   (KR) .................. 10-2007-0120358

(51) Int. Cl.
   *G11B 5/82* (2006.01)
   *G11B 5/667* (2006.01)
   *G11B 5/66* (2006.01)
(52) U.S. Cl. .................. 360/135; 428/828; 428/829
(58) Field of Classification Search .......... 428/826–830; 360/135
   See application file for complete search history.

(56) References Cited

U.S. PATENT DOCUMENTS

| | | | |
|---|---|---|---|
| 6,865,044 B1 * | 3/2005 | Albrecht et al. | 360/59 |
| 6,882,488 B1 * | 4/2005 | Albrecht et al. | 360/55 |
| 6,906,879 B1 * | 6/2005 | Albrecht et al. | 360/55 |
| 6,947,235 B2 * | 9/2005 | Albrecht et al. | 360/55 |
| 7,833,639 B2 * | 11/2010 | Sonobe et al. | 428/826 |
| 7,867,406 B2 * | 1/2011 | Albrecht et al. | 216/22 |
| 7,881,014 B2 * | 2/2011 | Lim et al. | 360/135 |
| 7,911,739 B2 * | 3/2011 | Jubert | 360/135 |
| 2005/0122609 A1 * | 6/2005 | Albrecht et al. | 360/55 |
| 2005/0122612 A1 * | 6/2005 | Albrecht et al. | 360/59 |
| 2006/0177702 A1 * | 8/2006 | Ajan | 428/828.1 |
| 2008/0075845 A1 * | 3/2008 | Sonobe et al. | 427/130 |
| 2008/0085424 A1 * | 4/2008 | Dobin et al. | 428/826 |
| 2008/0090104 A1 * | 4/2008 | Sonobe et al. | 428/800 |
| 2008/0292907 A1 * | 11/2008 | Berger et al. | 428/828 |
| 2009/0231755 A1 * | 9/2009 | Takahashi et al. | 360/110 |
| 2010/0221581 A1 * | 9/2010 | Lee et al. | 428/833.1 |

FOREIGN PATENT DOCUMENTS

WO    WO 2006135034 A1 * 12/2006

OTHER PUBLICATIONS

Chinese Office Action issued Jul. 13, 2011 in Chinese Application No. 200810212611.7.

* cited by examiner

*Primary Examiner* — Will J Klimowicz
(74) *Attorney, Agent, or Firm* — Ladas & Parry, LLP

(57) ABSTRACT

A magnetic recording medium and a method of manufacturing the magnetic recording medium are provided. In order to increase the recording density of the magnetic recording medium, the magnetic recording medium is configured to multiple magnetic layers by consecutively forming a first magnetic layer having a thin film shape and a second magnetic layer comprising patterned magnetic bits. The first magnetic layer has a magnetic anisotropic coefficient greater than that of the second magnetic layer.

11 Claims, 3 Drawing Sheets

MAGNETIC RECORDING MEDIA AND METHOD OF FABRICATING THE SAME

CROSS-REFERENCE TO RELATED PATENT APPLICATION

This application claims priority from Korean Patent Application No. 10-2007-0120358, filed on Nov. 23, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a magnetic recording medium having a magnetic layer on which information is recorded, wherein the magnetic layer has a plurality of magnetic layers including thin film type magnetic layers and pattern-shaped magnetic layers, and a method of manufacturing the same.

2. Description of the Related Art

Due to their characteristics such as large information storing capacity and high access speed, hard disc drives (HDDs) that have a magnetic recording medium are used as the main information memory devices in various digital apparatuses. The storing capacity of the magnetic recording medium is determined by a track density (tracks per inch, TPI) in a radial direction of a disc and a linear density (bits per inch, BPI) in a rotational direction of the disc.

Consecutive magnetic recording media, that is, magnetic recording media in which the bits are not physically separated, have a limit in increasing the TPI and BPI by reducing the size of bits or the pitch of the tracks. This is because, if the size of bits or the pitch of the tracks is reduced below a predetermined limit, noise increases and the recording stability is rapidly reduced due to mutual magnetic interference between adjacent bits.

In order to address the above problems, patterned media such as discrete track media (DTM) and bit patterned media (BPM), in which tracks and bits are physically separated by forming the bits and the tracks in a pattern, have been developed. In the DTM, the tracks form concentric circles and are separated from each other in a radial direction of the disc, and in the BPM, the bits which are unit recording regions are separated in an island shape. The separating regions between the patterned tracks and the bits are emptied or filled with a non-magnetic material.

Magnetic recording media formed in the patterned shape may have high recording density since there is no interference between tracks or adjacent bits which are unit bit regions.

In order to further increase the storing capacity, that is, the recording density of the DTM, the magnetic layer in which information is recorded must have a characteristic different from that of a conventional vertical magnetic recording media. The magnetic layer must have a large magnetic anisotropy and a small grain size. However, a material having a large magnetic anisotropy, that is, a high coercivity, may not be recorded using a conventional magnetic head. In this case, a magnetic head that may apply a high magnetic field so as to inverse the magnetization of a magnetic layer having high coercivity must be used. However, in order to increase the magnetic field to a maximum level in a magnetic head, the structure and material of the magnetic head must be modified.

SUMMARY OF THE INVENTION

To address the above and/or other problems, exemplary embodiments of the present invention provide a magnetic recording medium having an increased track density and linear recording density by forming a magnetic layer, in which information is recorded, in a plurality of layers.

The present invention also provides a magnetic recording medium on which information may be effectively recorded without the need of modifying a conventional magnetic head.

The present invention also provides a method of manufacturing a magnetic recording medium.

According to an aspect of the present invention, there is provided a magnetic recording medium comprising: a substrate; a first magnetic layer having a thin film shape formed on the substrate; and a second magnetic layer formed on the first magnetic layer comprising patterned magnetic bits.

The first magnetic layer and the second magnetic layer may respectively have vertical magnetic anisotropies. The first magnetic layer and the second magnetic layer may have magnetic anisotropic coefficients different from each other.

The first magnetic layer may have a magnetic anisotropic coefficient greater than that of the second magnetic layer.

The magnetic bits of the second magnetic layer may form a circular track shape. The magnetic bits of the second magnetic layer may be island-shaped patterns independent from each other.

The second magnetic layer may comprise a resin between the magnetic bits to separate the magnetic bits The magnetic recording medium may further comprise an exchange coupling layer between the first magnetic layer and the second magnetic layer.

The magnetic recording medium may further sequentially comprise a soft magnetic under layer and an intermediate layer between the substrate and the first magnetic layer.

According to another aspect of the present invention, there is provided a method of manufacturing a magnetic recording medium comprising: forming a soft magnetic under layer on a substrate; forming a first magnetic layer on the soft magnetic under layer; forming resin patterns for forming magnetic bits of a second magnetic layer after forming a resin layer on the first magnetic layer; and forming the magnetic bits between the resin patterns.

The resin patterns may be formed using a nano imprinting process, a thermal nano imprinting process, or a glass compression molding method. The first magnetic layer or the second magnetic layer may be formed using a sputtering method or an electroplating method.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF EXEMPLARY EMBODIMENTS OF THE INVENTION

Figure 1:
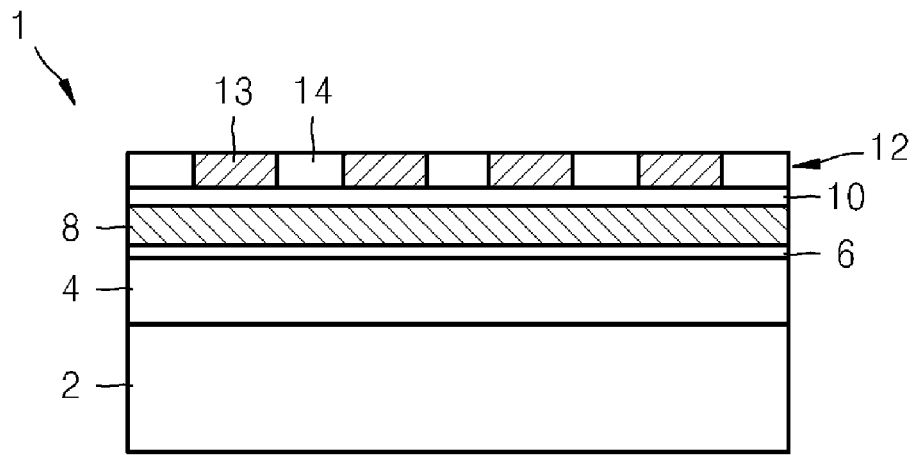
FIG. 1 is a cross-sectional view of a magnetic recording medium according to an exemplary embodiment of the present invention.

The present invention will now be described more fully with reference to the accompanying drawings in which exemplary embodiments of the invention are shown. In the drawings, the thicknesses of layers and regions are exaggerated for clarity, and like reference numerals refer to the like elements.

FIG. 1 is a cross-sectional view of a magnetic recording medium according to an exemplary embodiment of the present invention.

Referring to FIG. 1, a magnetic recording medium 1 according to an exemplary embodiment of the present invention includes a soft magnetic under layer 4, an intermediate layer 6, a first magnetic layer 8, an exchange coupling layer 10, and a second magnetic layer 12, which are sequentially stacked on a glass substrate 2. The second magnetic layer 12 is divided into a plurality of magnetic bits 13 by a resin 14.

A protective layer (not shown) and a lubricating layer (not shown) may further be formed on the second magnetic layer 12.

In the magnetic recording medium 1, a magnetic layer in which information is recorded is configured in multiple layers of the first magnetic layer 8 and the second magnetic layer 12, and preferably, but not necessarily, the first magnetic layer 8 has a thin film shape and the second magnetic layer 12 has a plurality of tracks in which the tracks are separated from each other. The tracks of the second magnetic layer 12 form concentric circles having an equal interval between the tracks. That is, the magnetic recording medium 1 has a discrete track medium structure.

Also, the magnetic bits 13 of the second magnetic layer 12 may have island shapes magnetically separated from each other by the resin 14 in the same track.

The first magnetic layer 8 and the second magnetic layer 12 respectively have vertical magnetic anisotropy, and have magnetic anisotropy coefficients different from each other. At this point, the first magnetic layer 8 may have a magnetic anisotropy coefficient greater than that of the second magnetic layer 12.

The first magnetic layer 8 is the main magnetic layer of the magnetic recording medium 1 for recording information, and the second magnetic layer 12 performs an auxiliary action when a head records information in the first magnetic layer 8, that is, when the magnetization direction of the first magnetic layer 8 is controlled. That is, the magnetization reversal of the first magnetic layer 8 having a relatively larger magnetic anisotropy may be effectively performed by adding the magnetization force of the second magnetic layer 12 to the magnetization force of the head.

The first magnetic layer 8 may have a granular structure having a plurality of grains, and each of the grains is separated from each other by a non-magnetic body. For example, each of CoCrPt crystal grains is surrounded by $SiO_2$, and thus, the CoCrPt crystal grains are magnetically separated from each other.

The first magnetic layer 8 and the second magnetic layer 12 may be formed, for example, using a sputtering method or an electroplating method.

A feature of the present invention is the inclusion of the second magnetic layer 12 in the magnetic recording medium 1 so that a conventional head may effectively record information when a material having a large anisotropy is used to form the first magnetic layer 8. The second magnetic layer 12 may have a discrete track pattern shape in which tracks are separated.

The soft magnetic under layer 4 induces a magnetic field of the recording head in a downward direction of the magnetic recording medium 1, and may be formed of one or more selected from CoZrNb, CoFeZrNb, NiFe, NiFeMo, or CoFeNi to a thickness of 5 to 300 nm.

The intermediate layer 6 is formed of a non-magnetic material as a seed layer for the first magnetic layer 8 to be formed thereon, and is formed to increase the crystal orientation characteristic of the first magnetic layer 8. For example, the intermediate layer 6 may be formed of one or more selected from Ti, Ta, Ru, Pt, Cu, or Au, or may be a double layer film formed of two different materials selected from Ti, Ta, Ru, Pt, Cu, or Au. The intermediate layer 6 may also be formed of a material such as RuCr or MgO. The intermediate layer 6 may be formed to a thickness of a few to a few tens of nm, and preferably, but not necessarily, 10 to 30 nm.

The exchange coupling layer 10 that induces an exchange coupling between the first magnetic layer 8 and the second magnetic layer 12 is formed between the first magnetic layer 8 and the second magnetic layer 12. The exchange coupling force of the exchange coupling layer 10 may be controlled by the material for forming the exchange coupling layer 10 and the thickness of the exchange coupling layer 10. That is, the exchange coupling layer 10 facilitates the transmission of the magnetization direction of the first magnetic layer 8 to the second magnetic layer 12, and also, controls the crystal orientation of the second magnetic layer 12.

A method of operating the magnetic recording medium 1 according to the present exemplary embodiment will now be described.

Figure 2A:
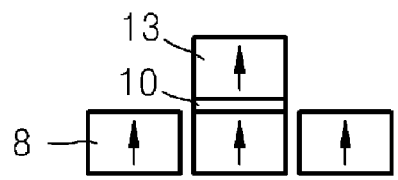
FIGS. 2A through 2C are drawings for explaining an operation principle of the magnetic recording medium of FIG. 1.
Figure 2B:
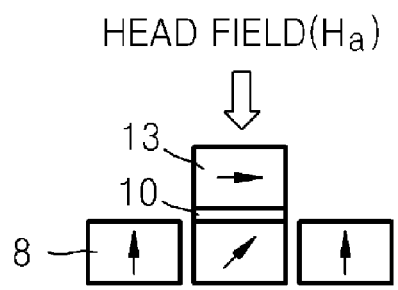
Figure 2C:
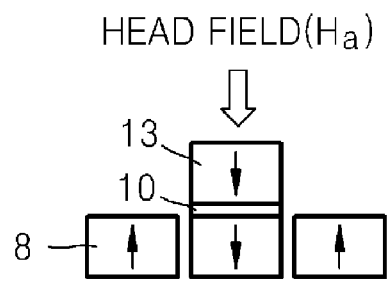

FIGS. 2A through 2C are drawings for explaining an operating principle of the magnetic recording medium of FIG. 1. Like reference numerals are used to indicate elements that are substantially identical to the elements of FIG. 1. The drawings are depicted for explaining the magnetization inversion.

Referring to FIG. 2A, the magnetization directions of the first magnetic layer 8 and the magnetic bit 13 of the second magnetic layer 12 are drawn in the same direction. Information is recorded by changing the magnetization direction of the first magnetic layer 8 below the magnetic bit 13 of the second magnetic layer 12 in a down-spin direction using a recording head.

Referring to FIG. 2B, the magnetization direction of the magnetic bit 13 of the second magnetic layer 12 is changed to a horizontal direction due to the spin-down of the magnetization direction of the recording head. At this point, the magnetization direction of the first magnetic layer 8 is changed to an oblique direction. This denotes that the first magnetic layer 8 is controlled less than the second magnetic layer 12 by the same magnetization force of the recording head since the first magnetic layer 8 has a coercivity greater than that of the second magnetic layer 12.

Referring to FIG. 2C, after the magnetization direction of the second magnetic layer 12 is changed to a down-spin direction, the magnetization directions of the recording head and the magnetic bit 13 of the second magnetic layer 12 are vectorially added. Thus, the spin-down magnetization direction of the second magnetic layer 12 is reinforced, and thus, the magnetization direction of the first magnetic layer 8 is changed to a down-spin direction.

That is, the magnetization direction of the magnetic bit 13 of the second magnetic layer 12 helps the magnetization of the recording head. Therefore, the magnetization inversion of the first magnetic layer 8 may be achieved using a much lower magnetic field of the recording head compared to the case when the first magnetic layer 8 having a large coercivity is formed without the second magnetic layer 12 thereon. If there is no second magnetic layer 12, the magnetization inversion of the first magnetic layer 8 may not be smoothly achieved using only the magnetization force of the recording head.

At this point, there is no magnetization inversion in regions of the first magnetic layer 8 where the magnetic bit 13 of the second magnetic layer 12 is not formed thereon, and thus, domains of the first magnetic layer 8 are physically operated as if they are magnetically completely separated from each other according to the shape of the magnetic bit 13 of the second magnetic layer 12. Here, $H_2$, $H_r$, $H_a$, and $H_1$ respectively indicate the magnitude of magnetic fields, and satisfy the following equation.

$$H_2 < H_r < H_a < H_1 \quad \text{[Equation 1]}$$

where $H_1$ is the magnitude of the magnetic field of a first magnetic layer alone, $H_2$ is the magnitude of the magnetic field of a second magnetic layer, $H_r$ is the magnitude of the magnetic field of a double layer film, and $H_a$ is maximum magnetic field of a recording head.

In the present invention, the magnetization inversion of the first magnetic layer 8 is possible using a recording head having a low magnetic field by adding the second magnetic layer 12 formed of a soft magnetic body, and thus, a conventional recording head may be used without modifications, and the grain size of the first magnetic layer 8 may be reduced while maintaining the thermal stability of the first magnetic layer 8. If the grain size is reduced, transition noise between bits of the magnetic recording medium 1 may be reduced, and accordingly, the linear recording density may be increased. As a result, a DTM having an overall high surface recording density may be obtained.

Generally, the thermal stability of a magnetic layer is proportional to a value of a magnetic anisotropic coefficient multiplied by a grain size. Thus, the magnetic anisotropic coefficient of the information recording magnetic layer according to the present invention may be increased even though the grain size is reduced, and thus, the thermal stability of the magnetic recording medium 1 may be maintained.

A method of manufacturing a magnetic recording medium 1 according to another exemplary embodiment of the present invention will now be described. Like reference numerals are used to indicate elements that are substantially identical to the elements of FIG. 1, and thus the detailed description thereof will not be repeated.

FIGS. 3A through 3E are cross-sectional views for illustrating a method of manufacturing a magnetic recording medium 1 according to an exemplary embodiment of the present invention.

Figure 3A:
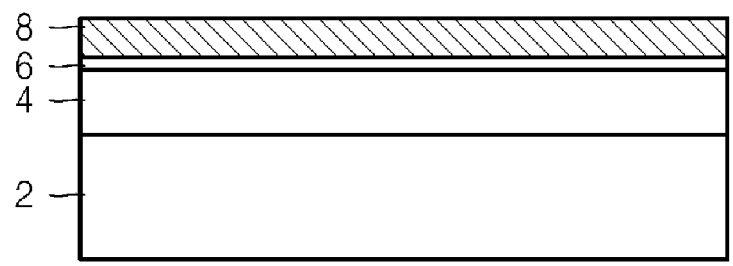
FIGS. 3A through 3E are cross-sectional views for illustrating a method of manufacturing a magnetic recording medium according to another exemplary embodiment of the present invention.

Referring to FIG. 3A, a soft magnetic under layer 4, an intermediate layer 6, and a first magnetic layer 8 are consecutively deposited on a glass substrate 2. At this point, the soft magnetic under layer 4 is formed to a thickness of 5 to 300 nm using a sputtering method, and the first magnetic layer 8 is also formed using the sputtering method. The intermediate layer 6 serves to magnetically separate the soft magnetic under layer 4 and the first magnetic layer 8, and controls the crystal orientation of the first magnetic layer 8.

Figure 3B:
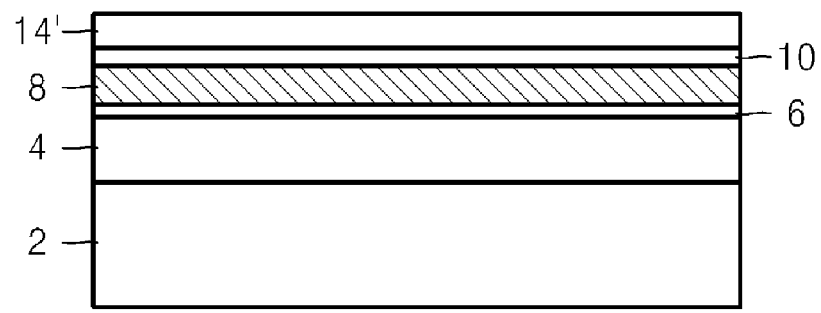

Referring to FIG. 3B, an exchange coupling layer 10 is deposited on the first magnetic layer 8 and a resin layer 14' is consecutively coated on the exchange coupling layer 10. The resin layer 14' may be an ultraviolet ray (UV) hardening layer.

Figure 3C:
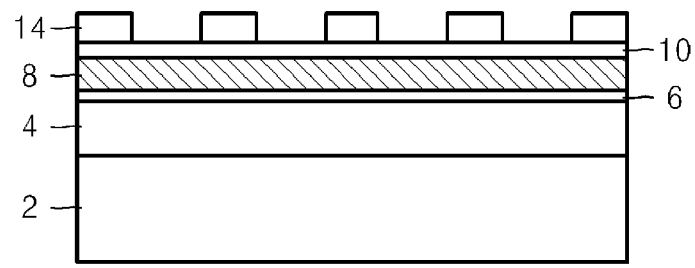

Referring to FIG. 3C, a resin pattern 14 for forming magnetic bits 13 of a second magnetic layer 12 is formed using a nano imprinting process on the resin layer 14'. In the nano imprinting process, a thermal nano imprinting process or a glass compression molding technique may be used besides the UV nano imprinting process.

Figure 3D:
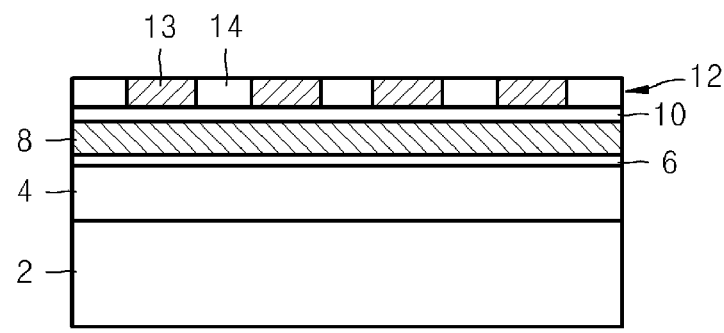

Referring to FIG. 3D, the magnetic bits 13 of the second magnetic layer 12 is formed between the resin patterns 14 using an electroplating method. That is, one characteristic of the method of manufacturing the magnetic recording medium 1 according to the present invention is that after forming a non-magnetic pattern using, for example, a resin, in a concentric circular shape by a nano patterning process, a magnetic material is filled between the non-magnetic patterns using an electroplating method. In the electroplating method, since a metal is plated on a seed layer having electrical conductivity, the magnetic bits 13 of the second magnetic layer 12 may be selectively formed on the portions of the exchange coupling layer 10 except for the portions covered by the non-magnetic resin pattern 14. At this point, if the electroplating time is controlled, an overall flat surface may be obtained without the need of an additional planarizing process.

Figure 3E:
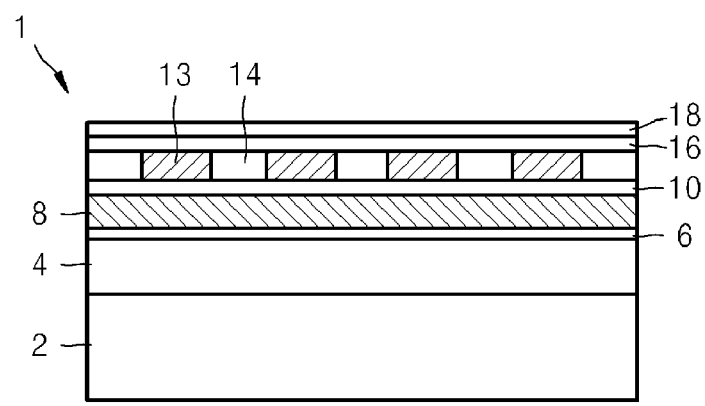

Referring to FIG. 3E, the manufacture of the magnetic recording medium 1 is completed by consecutively forming a protective layer 16 and a lubricating layer 18 on the second magnetic layer 12

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic recording medium comprising:
a substrate;
a first magnetic layer having a thin film shape formed on the substrate;
a second magnetic layer formed on the first magnetic layer, the second magnetic layer being a non-continuous layer comprising patterned magnetic bits,
wherein the first magnetic layer has a magnetic anisotropic coefficient greater than that of the second magnetic layer,
wherein the magnetic recording medium is configured such that, if a recording magnetic field is applied to the magnetic recording medium, then a magnetic field vector of one of the patterned magnetic bits of the second magnetic layer is vectorially added with a magnetic field vector of the recording magnetic field to induce perpendicular magnetization inversion of the first magnetic layer, and
wherein the first magnetic layer and the second magnetic layer each have an easy axis of magnetization that is perpendicular to a top surface of the magnetic recording medium.

2. The magnetic recording medium of claim 1, wherein the first magnetic layer and the second magnetic layer respectively have vertical magnetic anisotropy.

3. The magnetic recording medium of claim 1, wherein the magnetic bits of the second magnetic layer form a circular track shape.

4. The magnetic recording medium of claim 1, wherein the magnetic bits of the second magnetic layer are island shape patterns independent from each other.

5. The magnetic recording medium of claim 1, wherein the second magnetic layer comprises a resin between the magnetic bits to separate the magnetic bits.

6. The magnetic recording medium of claim 1, further comprising an exchange coupling layer between the first magnetic layer and the second magnetic layer.

7. The magnetic recording medium of claim 1, further sequentially comprising a soft magnetic under layer and an intermediate layer between the substrate and the first magnetic layer.

8. The magnetic recording medium of claim 1, wherein the first magnetic layer has a granular structure having a plurality of grains, and the grains are separated from each other by a non-magnetic material.

9. The magnetic recording medium of claim 8, wherein the grains are separated from each other by the non-magnetic material thereby creating domains,
   wherein the magnetic recording medium is configured such that the domains of the first magnetic layer exhibit respective magnetization directions as if the domains are magnetically separated from each other according to a shape of a corresponding one of the patterned magnetic bits of the second magnetic layer.

10. The magnetic recording medium of claim 1, wherein a maximum magnetic field vector that can be generated by a recording head providing the recording magnetic field is less than a minimum magnetic field vector required to induce perpendicular magnetization inversion of the first magnetic layer.

11. A magnetic recording medium comprising:
   a substrate;
   a first magnetic layer having a first magnetic anisotropic coefficient and being disposed on said substrate; and
   a second magnetic layer disposed on said first magnetic layer, said second magnetic layer being a non-continuous layer and having a second magnetic anisotropic coefficient,
   wherein said first magnetic anisotropic coefficient is greater than said second magnetic anisotropic coefficient,
   wherein the magnetic recording medium is configured such that, if a recording magnetic field is applied to the magnetic recording medium, then a magnetic field vector of the second magnetic layer is vectorially added with a magnetic field vector of the recording magnetic field to induce perpendicular magnetization inversion of the first magnetic layer, and
   wherein the first magnetic layer and the second magnetic layer each have an easy axis of magnetization that is perpendicular to a top surface of the magnetic recording medium.

* * * * *